(12) United States Patent
San Martin (10) Patent No.: US 10,267,944 B2
(45) Date of Patent: Apr. 23, 2019

(54) APPARATUS AND METHODS OF REDUCING ERROR IN MEASUREMENTS (71) Applicant: Halliburton Energy Services, Inc., Houston, TX (US)

(72) Inventor: Luis Emilio San Martin, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/430,427

(22) PCT Filed: Dec. 26, 2013

(86) PCT No.: PCT/US2013/077851
§ 371 (c)(1),
(2) Date: Mar. 23, 2015

(87) PCT Pub. No.: WO2015/099739
PCT Pub. Date: Jul. 2, 2015

(65) Prior Publication Data
US 2016/0025886 A1 Jan. 28, 2016

(51) Int. Cl.
G01D 3/036 (2006.01)
G01V 3/28 (2006.01)
G01V 3/34 (2006.01)
E21B 47/022 (2012.01)
(Continued)

(52) U.S. Cl.
CPC .................. *G01V 3/28* (2013.01); *G01V 3/34* (2013.01); *E21B 47/022* (2013.01); *G01B 21/045* (2013.01); *G01D 3/036* (2013.01); *G01D 5/145* (2013.01)

(58) Field of Classification Search
CPC ........... G01V 3/34; G01V 3/18; E21B 47/022
See application file for complete search history.

(56) References Cited

U.S. PATENT DOCUMENTS

| | | |
|---|---|---|
| 4,443,762 A | 4/1984 | Kuckes |
| 4,933,640 A | 6/1990 | Kuckes |
| 5,305,212 A | 4/1994 | Kuckes |

(Continued)

FOREIGN PATENT DOCUMENTS

WO  WO-2015/099739 A1  7/2015

OTHER PUBLICATIONS

"International Application Serial No. PCT/US2013/077851, International Search Report dated Sep. 24, 2014", 3 pgs.

(Continued)

*Primary Examiner* — Mischita L Henson
*Assistant Examiner* — Christine Y Liao
(74) *Attorney, Agent, or Firm* — Gillam IP PLLC (57) ABSTRACT Various embodiments include apparatus and methods to reduce error in measurements. In various embodiments, a field is measured at two sensors at different positions from each other, the two sensors are interchanged, and the field at the two sensors at the two interchanged positions is measured. Using the measurements acquired before the interchange and the measurements after the interchange, errors in measuring the field, a difference in the field, or a combination of the field and the difference in the field can be reduced. Additional apparatus, systems, and methods are disclosed.

26 Claims, 8 Drawing Sheets (51) Int. Cl.
*G01D 5/14* (2006.01)
*G01B 21/04* (2006.01)

(56) References Cited

U.S. PATENT DOCUMENTS

| | | | | |
|---|---|---|---|---|
| 5,331,578 | A | * | 7/1994 | Stieler .................. E21B 47/022 33/1 N |
| 5,412,317 | A | * | 5/1995 | Kyoizumi .............. G01B 7/003 324/207.13 |
| 6,278,389 | B1 | * | 8/2001 | Lochmann ............. G01P 21/02 341/118 |
| 8,065,085 | B2 | | 11/2011 | Ekseth et al. |
| 8,473,211 | B2 | | 6/2013 | Cheung |
| 8,490,717 | B2 | | 7/2013 | Bergstrom et al. |
| 2002/0180428 | A1 | * | 12/2002 | Weser ................ G01D 5/24461 324/207.25 |
| 2003/0012090 | A1 | * | 1/2003 | Kawano .............. G11B 7/0933 369/44.16 |
| 2003/0155912 | A1 | * | 8/2003 | Motz ..................... G01R 33/07 324/225 |
| 2007/0272031 | A1 | * | 11/2007 | Koba ..................... G01F 3/227 73/861.21 |
| 2008/0300791 | A1 | | 12/2008 | Sinclair et al. |
| 2010/0241410 | A1 | * | 9/2010 | McElhinney ............. E21B 7/04 703/10 |
| 2010/0332137 | A1 | | 12/2010 | Meadows et al. |
| 2011/0051109 | A1 | * | 3/2011 | Emoto .................. G03B 27/32 355/53 |
| 2011/0272569 | A1 | | 11/2011 | Sinclair et al. |
| 2011/0317715 | A1 | * | 12/2011 | Hood ....................... G01J 5/14 370/465 |
| 2012/0095685 | A1 | | 4/2012 | Ekseth et al. |
| 2013/0057287 | A1 | | 3/2013 | Le et al. |
| 2014/0309882 | A1 | * | 10/2014 | Antchak ................ F02B 67/06 701/36 |

OTHER PUBLICATIONS

"International Application Serial No. PCT/US2013/077851, Written Opinion dated Sep. 24, 2014", 5 pgs.

"European Application Serial No. 13894938.3, Extended European Search Report dated Sep. 16, 2015", 7 pgs.

"European Application Serial No. 13894938.3, Communication Pursuant to Article 94(3) EPC dated Jun. 28, 2016", 4 pgs.

"Australian Application Serial No. 2013408758, First Examiner Report dated Aug. 19, 2016", 3 pgs.

"Candian Application Serial No. 2,930,254; Office Action dated Mar. 3, 2017", 4 pages.

"Australian Application Serial No. 2013408758, Second Examiner Report dated Aug. 15, 2017", 3 pages.

CA Application Serial No. 2,930,254, Second Examiner's Letter, dated Feb. 27, 2018, 4 pages.

AU Application Serial No. 2017218926; AU First Examination Report; dated Mar. 16, 2018, 3 Pages.

AU Application Serial No. 2017218926, Examination Report No. 2, dated Jul. 30, 2018, 3 pages.

* cited by examiner

APPARATUS AND METHODS OF REDUCING ERROR IN MEASUREMENTS

PRIORITY APPLICATIONS

This application is a U.S. National Stage Filing under 35 U.S.C. 371 from International Application No. PCT/US2013/077851, filed on 26 Dec. 2013, which application is incorporated herein by reference in its entirety.

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. Measurements in a wellbore, also referred to as a borehole, are typically performed to attain this understanding. However, the environment in which the drilling tools operate is at significant distances below the surface and measurements to manage operation of such equipment are made at these locations.

Magnetometers are used in ranging applications to measure magnetic fields and magnetic field gradients. Such measurements can be used to detect the presence of nearby well casing, for the purpose of intersecting the well or, in steam assisted gravity drainage (SAGD) applications, to drill a well parallel to an existing well at a specified constant distance. The typical range of detection can be of tens of meters, with the range of detection being crucially dependent on the minimum signal level that the sensors are able to measure. Use of such sensors can include errors in measurement. The errors in such measurements may affect the precision or quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
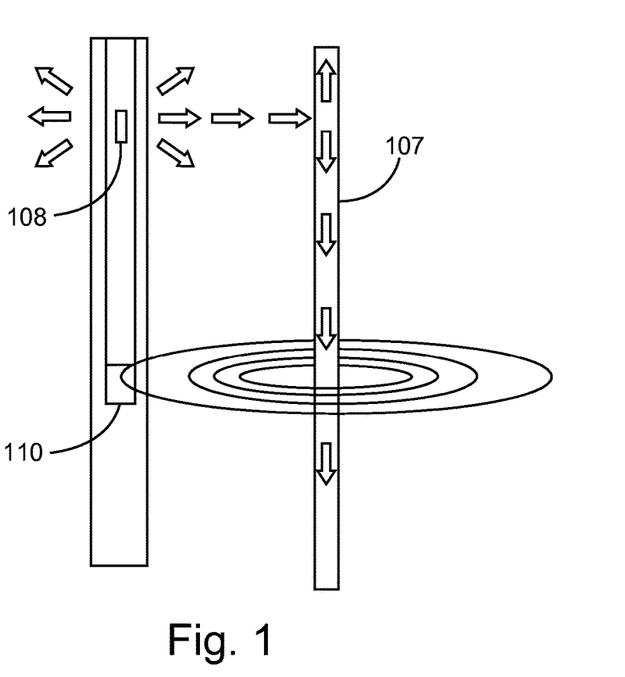
FIG. 1 is a schematic diagram of an example configuration used to estimate distance in ranging applications, in accordance with various embodiments.

FIG. 1 is a schematic diagram of an example configuration used to estimate distance in ranging applications. A current can be induced in a target casing 107 by injecting a current at a point 108 shown in the FIG. 1. This injected current reaches the target casing 107 and then flows through it generating a magnetic field, detected by sensors 110, whose magnitude is inversely proportional to the distance to the target casing 110, given by $$|H|=I/(2*PI*r),$$

where r is the radial distance from the target casing 107 and I is the current that flows through the target casing 107. The radial derivative of this field is derived from above to be $$\frac{dH}{dr} = -I/(2*PI*r^2) = -|H|r.$$

By taking the ratio of the field and the field derivative, the distance can be obtained as:

$$r=|H|/|\text{derivative of } H(\text{with respect to } r)|.$$

This derivation is somewhat simplified. For a more detailed description of this problem, see U.S. Pat. No. 5,305,212. The derivative is usually evaluated by measuring the field at two positions and subtracting the two results.

In ranging applications, accurate detection depends on the noise level of the receiver electronics. For the purpose of reducing the error of the electronics to a minimum it is convenient to implement a compensation scheme in the measurement of the very small gradient of the magnetic field that is used to obtain the ranging distance described above. In various embodiments, apparatus and methods of interchanging sensors within pairs of sensors can be implemented to reduce the error of these measurements.

Figure 2A:
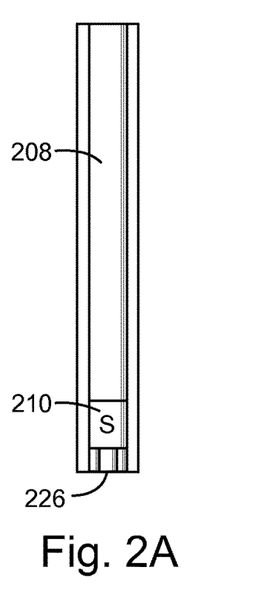
FIG. 2A is a schematic depiction of a typical drilling situation including a metal mandrel, a bit, and a zone of measuring devices, in accordance with various embodiments.
Figure 2B:
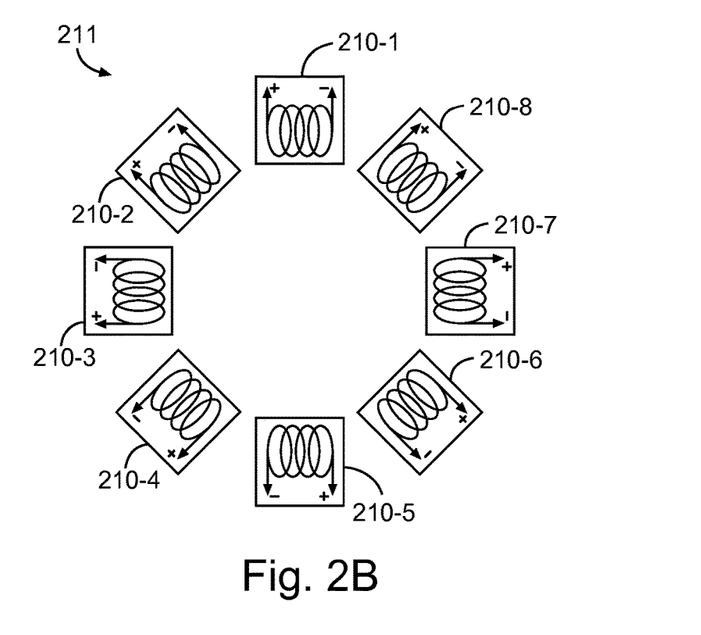
FIG. 2B is a schematic diagram of an example of a possible sensor configuration, in accordance with various embodiments.
Figure 2C:
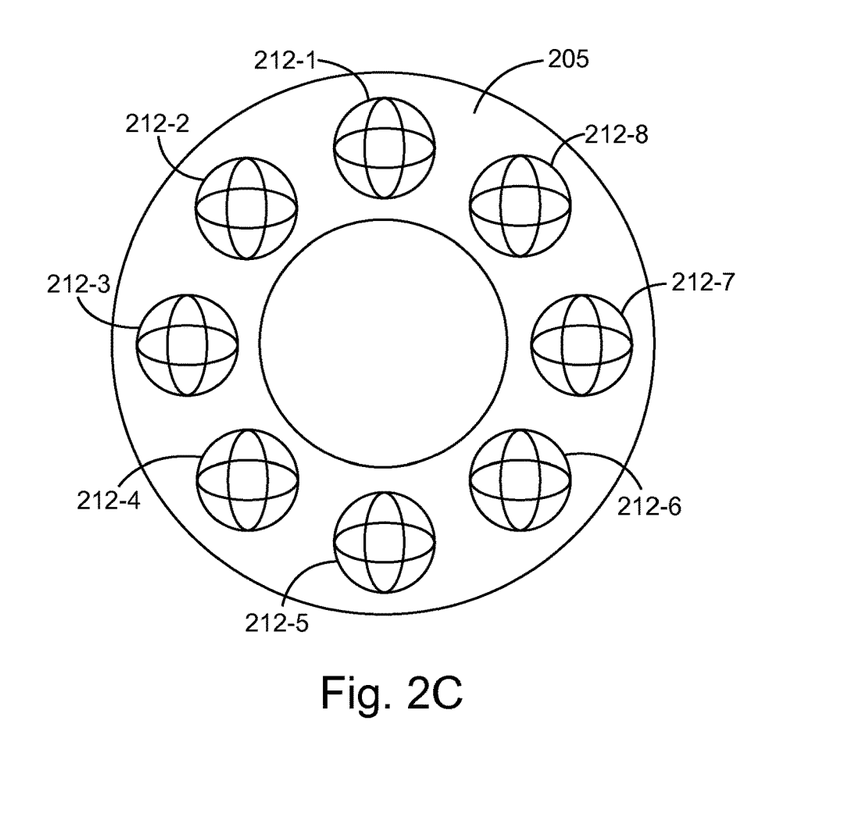
FIG. 2C is a schematic diagram of a disk with three axes magnetic field measuring sensors, in accordance with various embodiments.

FIG. 2A is a schematic depiction of a typical drilling situation including a metal mandrel 208, a bit 226, and a zone 210 (S) of measuring devices. The measuring devices can be realized as sensors, where the sensors are usually placed in the zone 208. FIG. 2B is a schematic diagram of an example of a possible sensor configuration 211 of sensors 210-1 . . . 210-8. The coils indicate magnetic field sensors, which could be coils or other type of sensors such as flux gate sensors, atomic magnetometers, etc. Even though the orientation of each solenoid indicates only one direction, each solenoid can be a triad of perpendicular sensors that measure along three perpendicular axes such as shown in FIG. 2C. FIG. 2C is a schematic diagram of a disk 205 with three axes magnetic field measuring sensors 212-1 . . . 212-8. When measuring the field and field derivatives for ranging applications, the drilling operation can be stopped to reduce the noise that is induced by the rotation of the mandrel 208. At this quiet period, the measurements can be taken followed by restarting the drilling. This cycle can be repeated until the target of the operation is reached.

In this type of application, the signals measured can be very small such that a method that can reduce the error further can be a significant help in increasing the accuracy of the detection distance of the tool. A way to reduce the effect of electronics error in the measurement of the gradient can be realized by implementing a compensation scheme for this measurement.

When taking the difference between the magnetic fields at two positions, to evaluate the derivative, it would be convenient to be able to eliminate the error that could be introduced by the electronic circuits connected to each of the sensors. It would also be desirable to eliminate the errors due to the slight differences between the sensors themselves. Even though the sensors are made to very precise tolerances, errors could be generated due to having slightly different temperature behavior or other slight difference in sensor properties. In some cases, it may be possible to improve the accuracy of the system by carefully characterizing it. But over time, the sensors or electronics could change slightly and it would have to be re-characterized periodically.

It would be preferable to have a scheme to eliminate these errors in a systematic manner to reduce the cost and improve the quality of the measurements.

Figure 3:
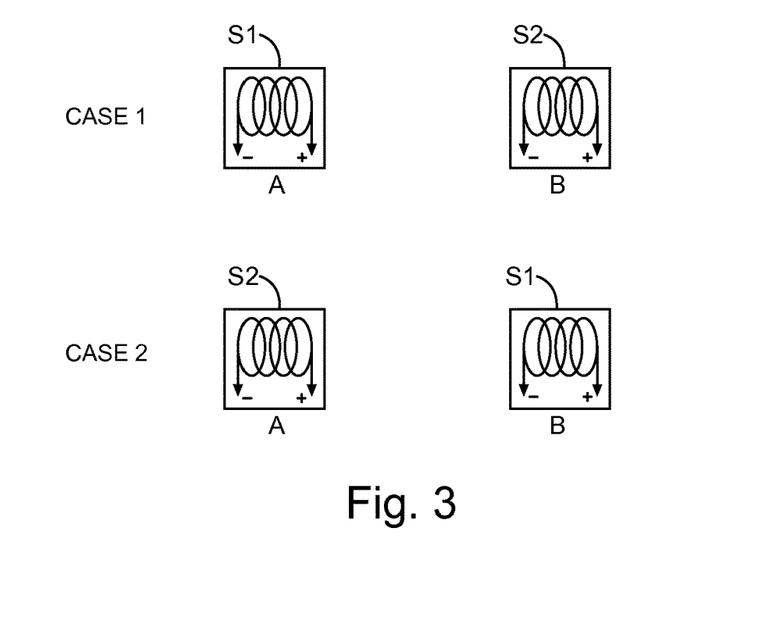
FIG. 3 is a schematic diagram of two cases with respect to two sensors to which a compensation scheme can be applied, in accordance with various embodiments.

FIG. 3 is a schematic diagram of two cases with respect to two sensors S1 and S2 to which a compensation scheme can be applied. The measurement of the two sensors S1 and S2 and the errors introduced by the small differences between sensors or sensor electronics can be taken into consideration. The following provides a procedure to eliminate these errors from the measurements with respect to the two cases by using a compensation scheme that compensates for the errors to remove them exactly. Consider the two positions A and B, where cases 1 and 2 describe the same configuration but with the position of the two sensors S1 and S2 reversed. A procedure to obtain the compensated measurement of the difference between the fields at point A and point B can include exchanging the position of the sensors S1 and S2. In case 1, sensor S1 is at location A and sensor S2 is at location B. In case 2, sensor S1 is at location B and sensor S2 is at location A. The magnetic field at point A is H(A), and the magnetic field at point B is H(B). Associated with the magnetic field is error due to electronics with respect to a sensor and error due to the sensor itself. The electronic error of sensor S1 can be represented EL-ERR(1) and the electronic error of sensor S2 can be represented by EL-ERR(2). The sensor error of sensor S1 can be represented by S-ERR(1) and the sensor error of sensor S2 is represented by S-ERR(2).

To evaluate the difference between the magnetic fields at points A and B, it is noted that the measured magnetic field includes the magnetic field plus the electronic error and the sensor error at each point being considered. Taking DIFF as the difference between the magnetic fields at points A and B (H(A)−H(B)), the following results for case 1 and case 2 shown in FIG. 3. In case 1, $DIFF=EL\text{-}ERR(1)+S\text{-}ERR(1)+H(A)-(EL\text{-}ERR(2)+S\text{-}ERR(2)+H(B))$ In case 2, $DIFF=EL\text{-}ERR(2)+S\text{-}ERR(2)+H(A)-(EL\text{-}ERR(1)+S\text{-}ERR(1)+H(B))$ To cancel errors, H(A)−H(B)=(Case 1+Case 2)/2 can be evaluated. This method provides a procedure to obtain a compensated measurement of the difference between the magnetic fields at the points A and B shown in FIG. 3. An accurate value of this difference is necessary to evaluate precisely the field derivative.

To achieve this systematic cancellation of errors, which improves the robustness and accuracy of the measurement, a situation like that depicted in FIG. 3 can be generated. Essentially the sensors can be interchanged, where as shown in FIG. 3, interchanging the sensors in this situation includes maintaining the polarity of the sensors. Once both measurements are generated, the errors can be cancelled by subtraction of the two measurements, as shown above. In this manner, a measurement in which the errors have been compensated can be obtained.

Figure 4:
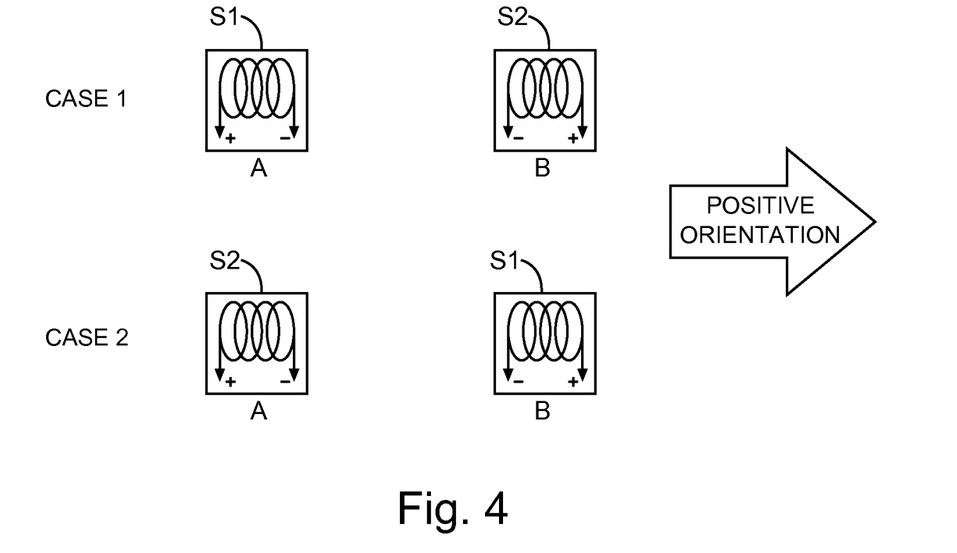
FIG. 4 is a schematic diagram of two measurement cases with respect to two sensors where the sensor polarity is such that the two measurements have the opposite orientation, in accordance with various embodiments.

A similar procedure can be implemented to measure a compensated value of the field. In this situation, the sensor polarity can be such that the two measurements have the opposite orientation. FIG. 4 is a schematic diagram of two measurement cases with respect to two sensors where the sensor polarity is such that the two measurements have the opposite orientation. The procedure, with respect to these two cases, to obtain the compensated measurement of the fields at point A and point B by exchanging the position of the sensors S1 and S2 is described in the following scheme. The result is the compensated measurement of the sum of fields at points A and B. In this scheme, a positive orientation is defined. In the situation of FIG. 4, the positive orientation is taken as going from negative to positive as in the sensors S1 and S2 at location B. Then, at location A, the polarity is reverse. This reversed polarity at location A leads to taking the difference, DIFF, between the magnetic fields at A and B to be equal to H(B)−(−H(A)). As with the situation of FIG. 3, the electronic error of sensor S1 can be represented EL-ERR(1) and the electronic error of sensor S2 can be represented by EL-ERR(2). The sensor error of sensor S1 can be represented by S-ERR(1) and the sensor error of sensor S2 is represented by S-ERR(2). In case 1, $DIFF=EL\text{-}ERR(2)+S\text{-}ERR(2)+H(B)-(EL\text{-}ERR(1)+S\text{-}ERR(1)-H(A)).$ In case 2, $DIFF=EL\text{-}ERR(1)+S\text{-}ERR(1)+H(B)-(EL\text{-}ERR(2)+S\text{-}ERR(2)-H(A)).$ To cancel errors, H(A)+H(B)=(Case 1+Case 2)/2 can be evaluated.

Figure 5:
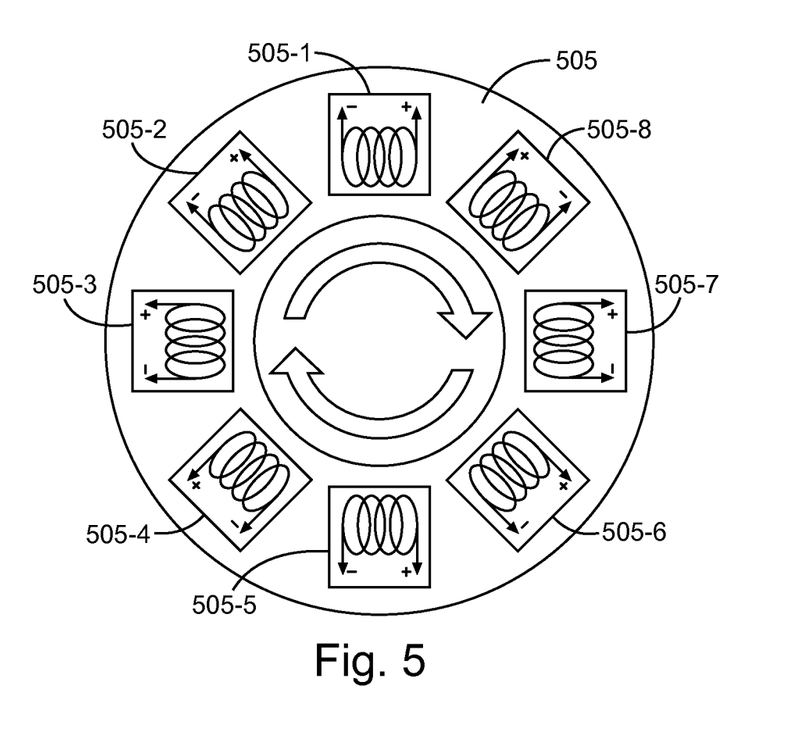
FIG. 5 is a schematic diagram of sensors mounted on a disk that can rotate, in accordance with various embodiments.

There are number of arrangements that can be implemented such that measurements can be taken for sensors interchanged maintaining and reversing polarity in the interchange. Such arrangements provide for the generation of the two measurements needed for the cancellation. One arrangement can be realized by mounting the sensors on a rotating ring. FIG. 5 is a schematic diagram of sensors 510-1 . . . 510-8 mounted on a sensor platform 505 that can be realized as a disk that can rotate. The measurements on both sides of the disk can be compensated by combining measurements as discussed with respect to FIG. 3. These sensor orientations can be used to measure compensated fields. The configuration 211 shown in FIG. 2B has the polarities to measure the compensated derivative.

Figure 6:
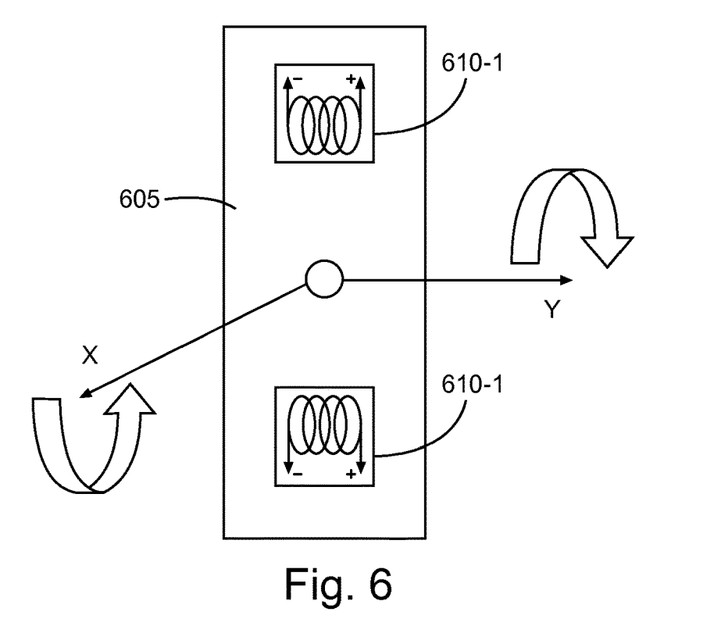
FIG. 6 is a schematic diagram of sensors mounted on a rectangular support that can rotate around two axes sequentially, in accordance with various embodiments.

Another arrangement can be realized by placing sensors on a beam that can rotate in two directions. FIG. 6 is a schematic diagram of sensors 610-1 and 610-2 mounted on a sensor platform 605 that can be realized as a beam such as rectangular support that can rotate around two axes sequentially. The measurements on both sides of the rectangle can be compensated by combining measurements as discussed with respect to FIG. 3. To use this configuration for the evaluation of compensated derivatives, the polarity of one of the sensors can be reversed. By appropriate timing of the measurement, the direction of the derivative can be obtained in the rotating disk. Given that the orientation of the sensors changes when the sensors are rotated, the measurements must be processed to ensure that the signs of the combinations are correct, independent of the rotation of the sensor.

Figure 7:
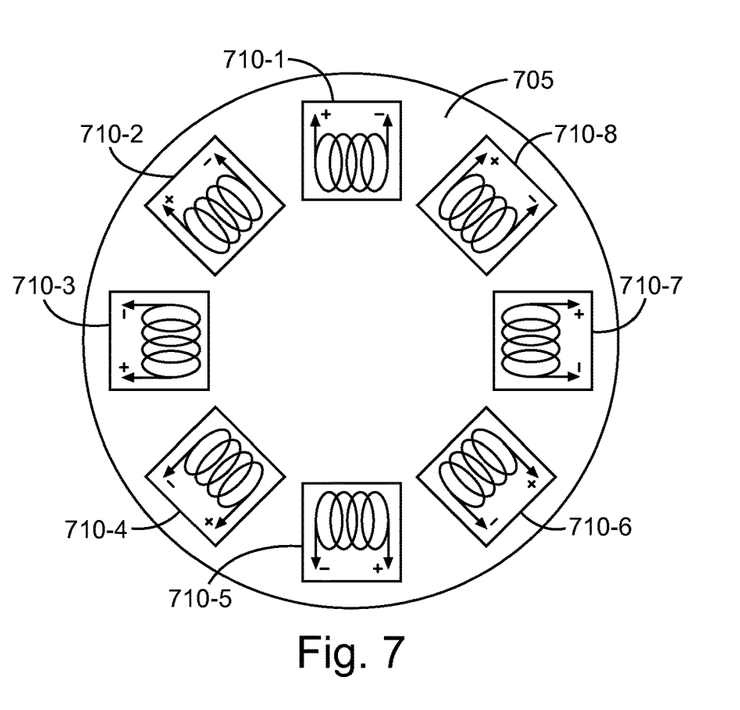
FIG. 7 is a schematic diagram of an example disk having all the sensors around the disk with opposite polarity, in accordance with various embodiments.

Using sensors mounted on a disk, there can be an effect of disk rotation on the sensors to interchange the position of the sensors. Because the sensors are fixed to the disk (cannot move relative to the disk) the sensor direction changes as the disk rotates. FIG. 7 is a schematic diagram of an example embodiment of a disk 705 having all sensors 710-1 . . . 710-8 around the disk 705 with opposite polarity. The following shows resulting polarities of a first configuration for disk rotation with sensors 710-1 . . . 710-8 fixed to disk 705. Positions A and B are opposite to each other such that with a 180° rotation a sensor at position B at an initial status (0° rotation) is moved into (interchanged with) position A (there are positions A and B corresponding to sensors of the sensors 710-1 . . . 710-8 considered in a pair-wise manner):

Configuration (1), with S1 being one of a pair of sensors of the sensors 710-1 . . . 710-8 and S2 being the other sensor of the one pair,

|  | Position A | Position B |
| --- | --- | --- |
| at 0° | + S1 − | − S2 + |
| at 180° | + S2 − | − S1 + |

As shown in FIG. 7, the 180° rotation results in reversed polarity of the sensors S1 and S2.

Figure 8:
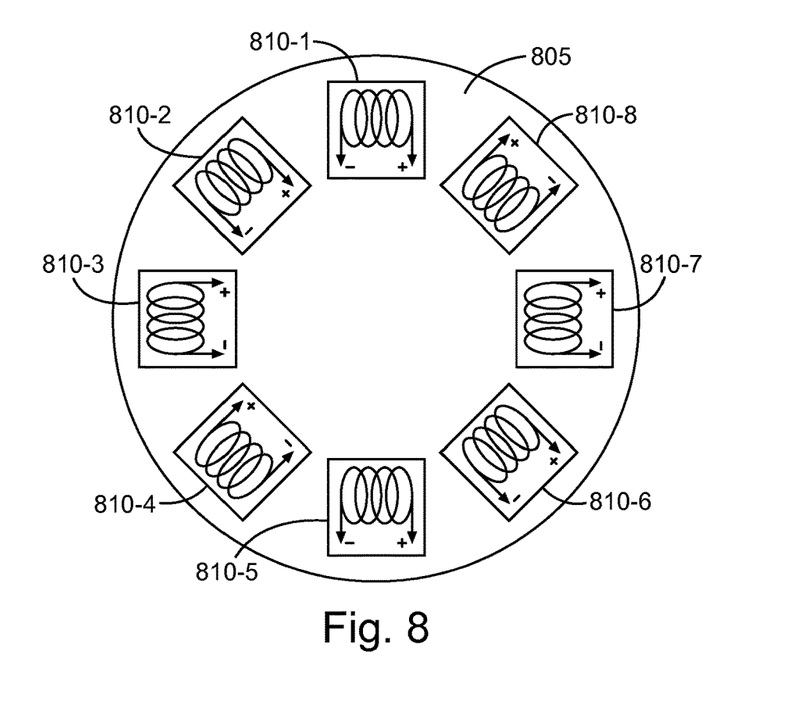
FIG. 8 is a schematic diagram of an example disk having all the sensors around the disk with the same polarity, in accordance with various embodiments.

FIG. 8 is a schematic diagram of an example embodiment of a disk 805 having all sensors 810-1 . . . 810-8 around the disk 805 with the same polarity. This is an example of a case of sensors 810-1 . . . 810-8 mounted on a disk 805 with a mechanism that allows them to maintain its spatial orientation fixed even as the disk 805 rotates. The following shows resulting polarities of a second configuration for disk rotation with a mechanism that keeps sensor orientation fixed in which S1 and S2 have the same polarity after interchange (180° rotation):

Configuration (2), with S1 being one of a pair of sensors of the sensors 810-1 . . . 810-8 and S2 being the other sensor of the one pair,

|  | Position A | Position B |
| --- | --- | --- |
| at 0° | + S1 − | + S2 − |
| at 180° | + S2 − | + S1 − |

As seen in FIG. 8, the 180° rotation results in maintained polarities. Such an arrangement may be realized with each sensor of the sensors 810-1 . . . 810-8, with S1 being one of a pair of sensors of the sensors 810-1 . . . 810-8 and S2 being the other sensor of the one pair, fixed to the disk by a sub-disk that can rotate in a synchronized manner with the primary disk to maintain spatial orientation of the sensors fixed in space, even as the disk rotates. Reversing wire contact to reverse the polarity of the measurement can be used together with the case of sensors mounted on the disk with a mechanism that allows them to maintain its spatial orientation fixed even as the disk rotates to preserve polarity when the disk rotates 180°.

Figure 9:
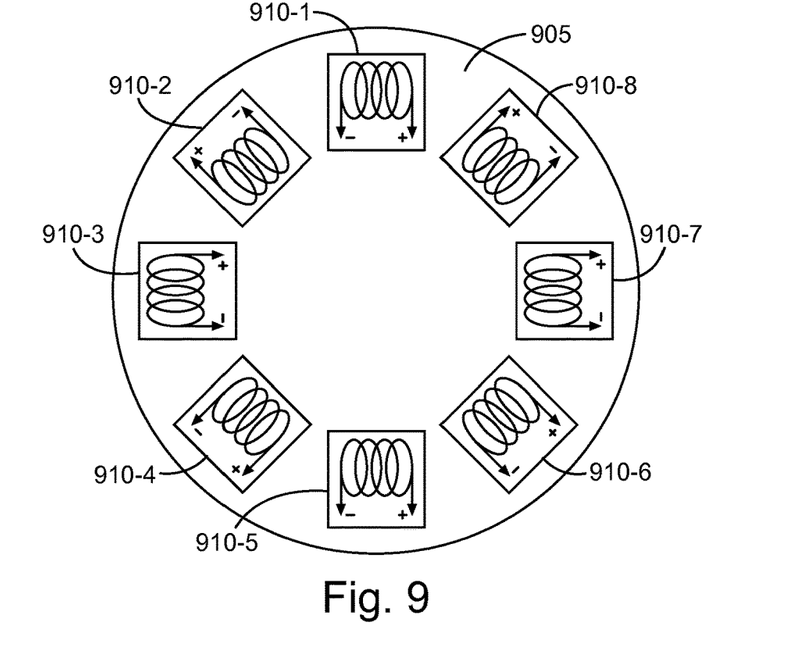
FIG. 9 is a schematic diagram of an example disk having half of the sensors with the same polarity and half of the sensors with opposite polarity, in accordance with various embodiments.

FIG. 9 is a schematic diagram of an example embodiment of a disk 905 having half of the sensors 910-1 . . . 910-8 with the same polarity and half of the sensors 910-1 . . . 910-8 with opposite polarity. The following shows resulting polarities of a third configuration for disk rotation with a mechanism that keeps sensor orientation fixed with S1 and S2 having opposite orientation:

Configuration (3), with S1 being one of a pair of sensors of the sensors 910-1 . . . 910-8 and S2 being the other sensor of the one pair,

|  | Position A | Position B |
| --- | --- | --- |
| at 0° | + S1 − | − S2 + |
| at 180° | − S2 + | + S1 − |

A multiplicative effect can occur with error in a multiplicative gain. Assume that there is a gain error caused by electronic drift or temperature effect, etc. The factor GDrift can be used to summarize all multiplicative errors in the gain. With a sensor configuration as shown in FIG. 8 without a mechanism to maintain the polarity, with meas(x,y) being the measured magnetic field at point x at rotation y, the following values of measurements is provided for the meas(x,y):

| Meas(A, 0°) | Meas(B, 0°) |
| --- | --- |
| GDrift($S_1$) *$H_A$ | GDrift($S_2$) *$H_B$ |
| Meas(A, 180°) | Meas(B, 180°) |
| − GDrift($S_2$) *$H_A$ | − GDrift($S_1$) *$H_B$ |

$$Meas(B,0°)-Meas(A,0°) => GDrift(S_2)*H_B - GDrift(S_1)*H_A \quad \text{Eq. (1)}$$

$$Meas(B,180°)-Meas(A,180°) => -GDrift(S_1)*H_B + GDrift(S_2)*H_A \quad \text{Eq. (2)}$$

$$Eq.\ (1)-Eq.\ (2) => (H_B-H_A)*\{GDrift(S2)+GDrift(S_1)\} \quad \text{Eq. 3}$$

This value can be divided by the distance between the sensors Δr to obtain an estimate of the derivative in a ranging operation.

To estimate the field at the center between the two sensors, the measurements can be operated in the following way:

$$Meas(B,0°)-Meas(A,0°)=>GDrift(S_2)*H_B+GDrift(S_1)*H_A \quad \text{Eq. (4)}$$

$$Meas(B,180°)-Meas(A,180°)=>-GDrift(S_1)*H_B-GDrift(S_2)*H_A \quad \text{Eq. (5)}$$

$$Eq.(4)-Eq.(5)=>(H_B+H_A)*\{GDrift(S_2)+GDrift(S_1)\} \quad \text{Eq. (6)}$$

To evaluate the ratio of the field and its spatial derivative, the following can be evaluated:

$$R=|H|/|\text{derivative of } H|=\{Eq.(6)/2\}/\{Eq.(3)/\Delta r\},$$

where the errors $\{GDrift(S_2)+GDrift(S_1)\}$, which appear in both, numerator and denominator, cancel.

If the rotation was not implemented, the measurement of the difference and the sum of the fields at the two positions would give $$Meas(B,0°)-Meas(A,0°)=>GDrift(S_2)*H_B-GDrift(S_1)*H_A \quad \text{Eq. (7)}$$

$$Meas(B,0°)+Meas(A,0°)=>GDrift(S_2)*H_B+GDrift(S_1)*H_A \quad \text{Eq. (8)}$$

In the ratio of Eq. (7) and Eq. (8), the drift errors do not cancel.

Error cancellation for the field derivative can be achieved by placing the sensors as shown in configuration (3) above. The error cancellation can use a scheme such as discussed with respect to FIG. 4. Error cancellation for the field can be achieved by placing the sensors as shown in configuration (2) above. The error cancellation can use a scheme such as discussed with respect to FIG. 3. Combination of both multiplicative error and additive error cancellation can be achieved by combining both procedures in the case of the evaluation of the ratio between the field and the field derivative.

The precise operation to be performed with the measurements, to achieve cancellation of errors, depends on the type of errors that are present in the measurements. Different ways of combining the measurements, different from the ones described here, may be more convenient. However, in each of these embodiments, the interchange in the position of the sensors is performed to gather sufficient measurements to achieve the cancellation. The interchange can be with the same or reverse orientation.

In configuration (1) shown above, the orientation of the sensors could be brought back to the original by exchanging the terminals of the sensors. This may be useful to achieve cancellation of additive errors in the way described above, even when the sensors are fixed to the disk.

In FIGS. 2B, 2C, 5, and 7-9, disks are shown with eight sensors. However, the apparatus and methods discussed herein are not limited to eight sensors. More or less than eight sensors may be used. It is noted that the interchange of sensors has been discussed with respect to two sensors. The use of disks having a plurality of sensors includes a number of pairs of sensors. For the examples shown in FIGS. 2B, 2C, 5, and 7-9, there are four pairs of sensors. More or less than four pairs of sensors may be used. In a disk structure, the pairs of sensors for interchange are disposed directly across from each other along a diagonal through the center of the disk. Interchange of sensors using such disks can be performed on a pair-wise basis.

The compensation technique, as taught herein, may improve the measurements in ranging applications. The use of this method may improve the accuracy of the ranging tool and distance of detection of the ranging tool can be improved. In addition, the cost of producing the tool may be reduced, shortening the tool characterization tests. Though the discussion above has been related to magnetic fields, the techniques taught herein can be implemented with respect to electromagnetic fields, electric fields, or other fields that can be represented as spatial functions, depending on the application.

Figure 10:
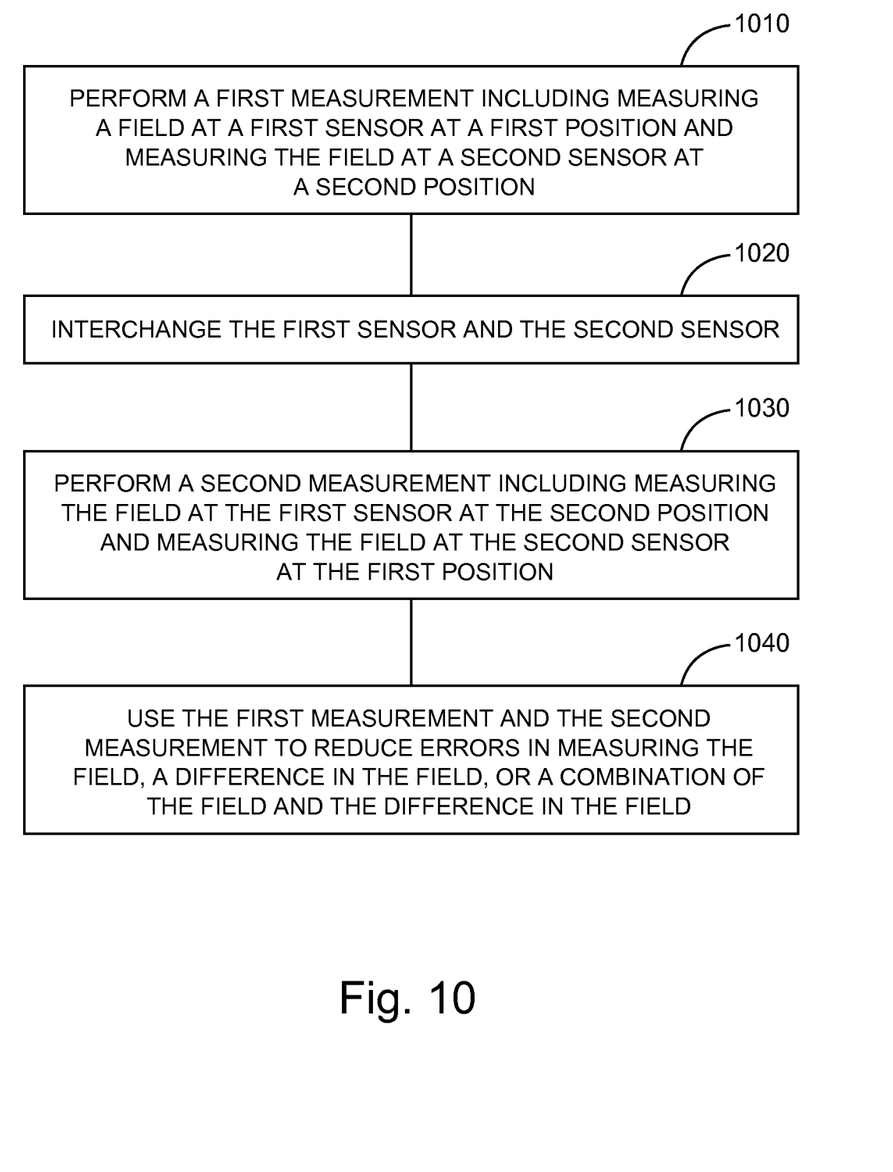
FIG. 10 is a flow diagram of features of an embodiment of an example method of reducing errors in measurements, in accordance with various embodiments.

FIG. 10 is a flow diagram of features of an embodiment of an example method of reducing errors in measurements. At 1010, a first measurement is performed including measuring a field at a first sensor at a first position and measuring the field at a second sensor at a second position. At 1020, the first sensor and the second sensor are interchanged. The interchange includes exchanging the first sensor with the second sensor such that the first sensor is at the second position and the second sensor is at the first position. Interchanging the first sensor and the second sensor can include interchanging the first sensor having a first polarity at the first position and the second sensor having a second polarity at the second position such that the first sensor has the first polarity at the second position and the second sensor has the second polarity at the first position. The first polarity can be the same as the second polarity. Interchanging the first sensor and the second sensor can include interchanging the first sensor having a first polarity at the first position and the second sensor having a second polarity at the second position such that the first sensor at the second position has a polarity reversed from the first polarity and the second sensor at the first position has a polarity reversed from the second polarity. The first polarity can be reversed from the second polarity. Interchanging the first sensor and the second sensor can include rotating a disk on which the first sensor and the second sensor are mounted. Interchanging the first sensor and the second sensor can include rotating a disk on which the first sensor and the second sensor are mounted; and reversing wire contact to the first sensor and the second sensor with rotation of the disk to the position of the second measurement.

At 1030, a second measurement is performed including measuring the field at the first sensor at the second position and measuring the field at the second sensor at the first position. At 1030, the first measurement and the second measurement are used to reduce errors in measuring the field, a difference in the field, or a combination of the field and the difference in the field.

In various embodiments, the method can include: generating, from the first measurement, a first difference between the measured field at the first position and the measured field at the second position; generating, from the second measurement, a second difference between the measured field at the first position and the measured field at the second position; and combining the first difference and the second difference. Generating the first difference can include generating the first difference with each of the first and second sensor positioned at a respective zero degree rotation position; generating the second difference can include generating the second difference with the first and second sensor positioned at a 180 degree rotation from their respective zero rotation positions; and combining the first difference and the second difference can include generating a difference between the first difference and the second difference. In various embodiments, the method can include: generating, from the first measurement, a first sum between the measured field at the first position at the zero degree rotation position and the measured field at the second position at the zero degree rotation position; generating, from the second measurement, a second sum between the measured field at the first sensor rotated 180 degrees from the zero rotation position of the first sensor and the measured field at the second sensor rotated 180 degrees from the zero rotation position of the second sensor; and generating a difference between the first sum and the second sum. The method can include determining a range using the difference between the first difference and the second difference, a distance between the first sensor and the second sensor, and the difference between the first sum and the second sum. Determining the range can include determining a range between a target pipe in a target well and a pipe to which the first and second sensors are mounted in another well.

In various embodiments, the measured field can be a magnetic field. The measured field can be an electromagnetic field or an electric field. The methods can include performing operations to conduct a ranging application with respect to two or more wells. The methods can include generating a current in one well that induces a current in another well that generates a magnetic field that can be measured by the first and second sensors. The methods can include operations to control a plurality of sensor pairs including the interchange of the sensors within the sensor pairs and the acquisition of measurement signals corresponding to measurements before and after the interchange. The methods can include any of the activities discussed herein to reduce errors in measurements as described herein.

In various embodiments, a non-transitory machine-readable storage device can comprise instructions stored thereon, which, when performed by a machine, cause the machine to perform operations, the operations comprising one or more features similar to or identical to features of methods and techniques related to reducing errors in measurements as described herein. The physical structure of such instructions may be operated on by one or more processors. Executing these physical structures can cause the machine to perform operations to: perform a first measurement including measuring a field at a first sensor at a first position and measuring the field at a second sensor at a second position; interchange the first sensor and the second sensor such that the first sensor is at the second position and the second sensor is at the first position; perform a second measurement including measuring the field at the first sensor at the second position and measuring the field at the second sensor at the first position; and use the first measurement and the second measurement to reduce errors in measuring the field, a difference in the field, or a combination of the field and the difference in the field.

The operations include operations to: generate, from the first measurement, a first difference between the measured field at the first position and the measured field at the second position; generate, from the second measurement, a second difference between the measured field at the first position and the measured field at the second position; and combine the first difference and the second difference. The operations to generate the first difference can include generating the first difference with each of the first and second sensor positioned at a respective zero degree rotation position; operations to generate the second difference can include generating the second difference with the first and second sensor positioned at a 180 degree rotation from their respective zero rotation positions; and operations to combine the first difference and the second difference can include generating a difference between the first difference and the second difference.

The operations can include operations to: generate, from the first measurement, a first sum between the measured field at the first position at the zero degree rotation position and the measured field at the second position at the zero degree rotation position; generate, from the second measurement, a second sum between the measured field at the first sensor rotated 180 degrees from the zero rotation position of the first sensor and the measured field at the second sensor rotated 180 degrees from the zero rotation position of the second sensor; and generate a difference between the first sum and the second sum. The operations can include operations to determine a range using the difference between the first difference and the second difference, a distance between the first sensor and the second sensor, and the difference between the first sum and the second sum.

The operations can include operations to conduct a ranging application with respect to two or more wells. The operations can include generating a current in one well that induces a current in another well that generates a magnetic field that can be measured by the first and second sensors. The operations can include operations to control a plurality of sensor pairs including the interchange of the sensors within the sensor pairs and the acquisition of measurement signals corresponding to measurements before and after the interchange. The operations can include any of the activities discussed herein to reduce errors in measurements as described herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 11:
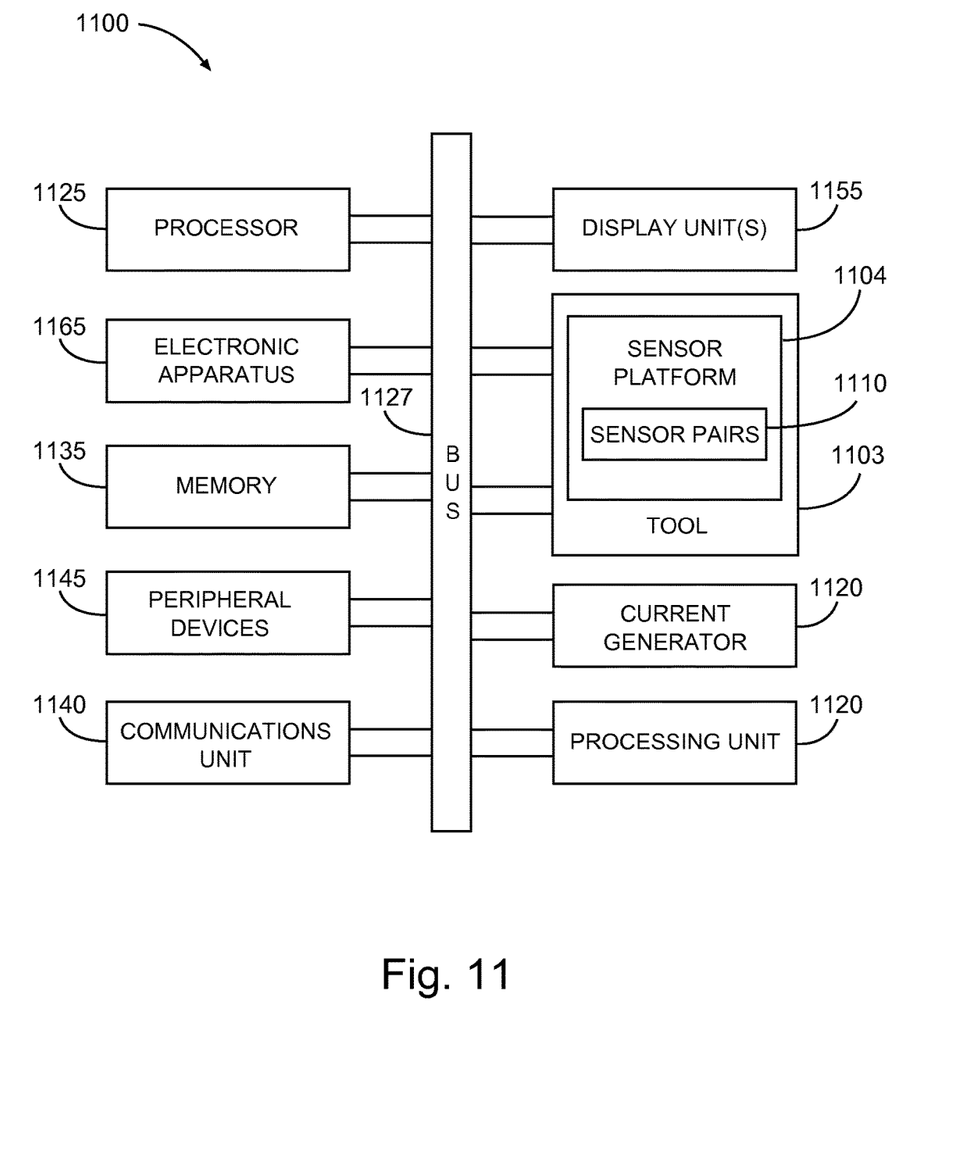
FIG. 11 is a block diagram of an example system 1100 operable to reduce errors in measurements, in accordance with various embodiments.

FIG. 11 is a block diagram of an example system 1100 operable to reduce errors in measurements as taught herein. The system 1100 can include a tool 1103 to conduct measurements in a wellbore and to process data derived from operating the tool 1103. The tool 1103 can include one or more pairs 1110 of sensors mounted on a sensor platform 1104 where a first sensor of one of the one or more pairs 1110 is at a first position and is operable to measure a field and a second sensor of the one or more pairs 1110 is at a second position and is operable to measure the field. Arrangements of the one or more pairs 1110 of sensors of the tool 1103 can be realized similar to or identical to arrangements discussed herein.

The sensor platform 1104 of the tool 1103 on which the one or more pairs 1110 of sensors can be mounted may be realized in a manner identical to or similar to sensor platforms and pairs of sensors as taught herein. The sensor platform 1104 can be a rotatable disk on which the first sensor is mounted on a diagonal through a center of the disk and the second sensor is mounted on the diagonal on an opposite side of the center from the first sensor. The rotatable disk can include one or more sensor pairs, in addition to the first sensor and the second sensor, mounted thereon such each sensor of each sensor pair has an opposite orientation with respect to polarity compared to the other sensor of the respective pair. The sensor platform 1104 can include one or more sensor pairs, in addition to the first sensor and the second sensor, mounted thereon such that all of the sensors have a common orientation with respect to polarity. The sensor platform 1104 can include one or more sensor pairs, in addition to the first sensor and the second sensor, mounted thereon such that a first half of the sensors have a common orientation with respect to polarity and a second half of the sensors have an opposite polarity to the first half of the sensors. The sensor platform 1104 can be a beam that can rotate in two directions.

The system 1100 can include a processor 1125 operable with the sensor platform 1104 such that the processor 1125 provides control of the sensor platform 1104 such that the first sensor is operably interchanged with the second sensor, provides control of acquisition of measurement signals from the first sensor and the second sensor at both the first position and the second position; and provides use of the acquisition of the measurement signals to reduce errors in measurement of the field, a difference in the field, or a combination of the field and the difference in the field. The processor 1125 can be realized as one or more processors. The system 1104 can include a machine-readable storage device having instructions stored thereon, which, when executed by the processor, cause the system to perform operations, the operations including a determination of a range between a target pipe in a target well and a pipe to which the first and second sensors are mounted in another well based on the acquisition of the measurement signals from the first sensor and the second sensor interchanged by control of the sensor platform 1104. The machine-readable storage device can be realized by a memory 1135. The memory 1135 can include instructions to perform functions as taught herein to reduce errors.

The processor 1125 and the memory 1135 can be arranged to operate the tool 1103 to acquire measurement data as the tool 1103 is operated. The processor 1125 and the memory 1135 can be realized to control activation of a current generator 1115 that can be used to perform ranging operations. The ranging operations can include determination of a range between a target pipe in a target well and a pipe to which the first and second sensors of the one or more pairs 1110 of sensors are mounted in another well. The processor 1125 and the memory 1135 can be realized to control data acquisition from selected ones of the one or more pairs 1110 of sensors of the tool 1103 and to manage processing schemes with respect to data derivable from measurements using tool 1103 as described herein. Alternatively, a separate processing unit 1120 can be structured to perform the operations to manage processing schemes in a manner similar to or identical to embodiments described herein.

Depending on the application, the system 1100 may include a number of components. The system 1100 may also include one or more of electronic apparatus 1165, peripheral devices 1145, display unit(s) 1155, and a communications unit 1140. Electronic apparatus 1165 can be used in conjunction with the processor 1125 to perform tasks associated with taking measurements downhole with the tool 1103. The communications unit 1140 can include downhole communications in a drilling operation. Such downhole communications can include a telemetry system.

The system 1100 can also include a bus 1127, where the bus 1127 provides electrical conductivity among the components of the system 1100. The bus 1127 can include an address bus, a data bus, and a control bus, each independently configured. The bus 1127 can also use common conductive lines for providing one or more of address, data, or control, the use of which can be regulated by the processor 1125. The bus 1127 can be configured such that the components of the system 1100 are distributed. Such distribution can be arranged between downhole components such as the one or more pairs 1110 of sensors of the tool 1103 and components that can be disposed on the surface of a well. Alternatively, various of these components can be co-located such as on one or more collars of a drill string or on a wireline structure.

In various embodiments, peripheral devices 1145 can include displays, additional storage memory, and/or other control devices that may operate in conjunction with the processor 1125 and/or the memory 1135. The peripheral devices 1145 can be arranged to operate in conjunction with display unit(s) 1155 with instructions stored in the memory 1135 to implement a user interface to manage the operation of the tool 1103 and/or components distributed within the system 1100. Such a user interface can be operated in conjunction with the communications unit 1140 and the bus 1127. Various components of the system 1100 can be integrated with the tool 1103 such that processing identical to or similar to the processing schemes discussed with respect to various embodiments herein can be performed downhole in the vicinity of the measurement or at the surface.

Figure 12:
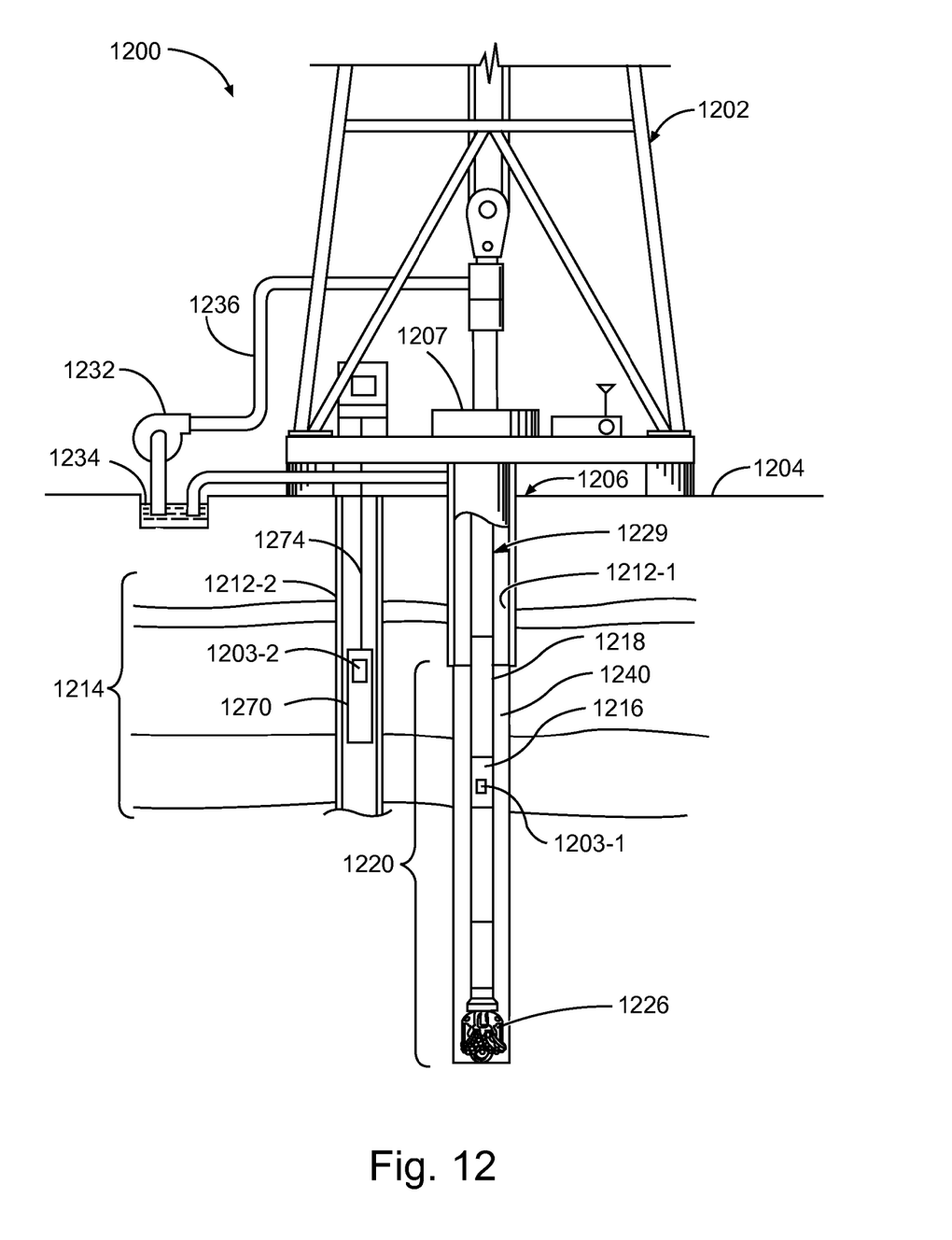
FIG. 12 is a schematic diagram of an example system at a drilling site, where the system is operable with apparatus to reduce errors in measurements, in accordance with various embodiments.

FIG. 12 is a schematic diagram of an example system 1200 at a drilling site, where the system is operable with apparatus to reduce errors in measurements, as described herein or in a similar manner. The system 1200 can include a tool 1203-1, 1203-2, or both 1203-1 and 1203-2 to conduct measurements and analysis using one or more sensor pairs as taught herein. Tools 1203-1 and 1203-2 can be realized in a similar or identical manner to arrangements taught herein.

System 1200 can include a drilling rig 1202 located at a surface 1204 of a well 1206 and a string of drill pipes, that is, drill string 1229, connected together so as to form a drilling string that is lowered through a rotary table 1207 into a wellbore or borehole 1212-1. Drilling rig 1202 can provide support for drill string 1229. Drill string 1229 can operate to penetrate rotary table 1207 for drilling the borehole 1212-1 through subsurface formations 1214. Drill string 1229 can include drill pipe 1218 and a bottom hole assembly 1220 located at the lower portion of drill pipe 1218.

The bottom hole assembly 1220 can include a drill collar 1216 and a drill bit 1226. Drill bit 1226 can operate to create borehole 1212-1 by penetrating the surface 1204 and the subsurface formations 1214. Bottom hole assembly 1220 can include tool 1203-1 attached to drill collar 1216 to perform measurements to conduct formation evaluation. Tool 1203-1 can be structured for an implementation in a measure-while-drilling (MWD) system such as a logging-while-drilling (LWD) system. The housing containing tool 1203-1 can include electronics to control tool 1203-1 and collect responses from one or more sensor pairs of tool 1203-1. Such electronics may include a processing unit to provide analysis of ranging data to the surface over a standard communication mechanism for operating in a well. Alternatively, electronics can include a communications interface to provide signals output by the arrangement of the one or more sensor pairs of tool 1203-1 to the surface over a standard communication mechanism for operating in a well, where these output signals can be analyzed at a processing unit at the surface.

During drilling operations, drill string 1229 can be rotated by rotary table 1207. In addition to, or alternatively, the bottom hole assembly 1220 can also be rotated by a motor (e.g., a mud motor) that is located downhole. Drill collars 1216 can be used to add weight to drill bit 1226. Drill collars 1216 also can stiffen the bottom hole assembly 1220 to allow the bottom hole assembly 1220 to transfer the added weight to drill bit 1226, and in turn, assist drill bit 1226 in penetrating surface 1204 and subsurface formations 1214.

During drilling operations, a mud pump 1232 can pump drilling fluid (sometimes known by those of skill in the art as "drilling mud") from a mud pit 1234 through a hose 1236 into drill pipe 1218 and down to drill bit 1226. The drilling fluid can flow out from drill bit 1226 and be returned to the surface 1204 through an annular area 1240 between drill pipe 1218 and the sides of the borehole 1212-1. The drilling fluid may then be returned to mud pit 1234, where such fluid is filtered. In some embodiments, the drilling fluid can be used to cool drill bit 1226, as well as to provide lubrication for drill bit 1226 during drilling operations. Additionally, the drilling fluid may be used to remove subsurface formation 1214 cuttings created by operating drill bit 1226.

In various embodiments, tool 1203-2 may be included in a tool body 1270 coupled to a logging cable 1274 such as, for example, for wireline applications. The tool body 1270 containing the tool 1203-2 can include electronics to control tool 1203-2 and collect responses from the one or more sensor pairs of the tool 1203-2. Such electronics may include a processing unit to provide analysis of ranging data to the surface over a standard communication mechanism for operating in a well. Alternatively, electronics can include a communications interface to provide signals output by the arrangement of the one or more sensor pairs of the tool 1203-2 to the surface over a standard communication mechanism for operating in a well, where these output signals can be analyzed at a processing unit at the surface. The logging cable 1274 may be realized as a wireline (multiple power and communication lines), a mono-cable (a single conductor), and/or a slick-line (no conductors for power or communications), or other appropriate structure for use in the borehole 1212-2. Though, for convenience, FIG. 12 depicts both an arrangement for wireline applications and an arrangement for LWD applications, the system 1200 may be also realized for one of the two applications or both applications in a single well at different times.

Different features presented herein may be used in different embodiments. In various embodiments, a method 1 comprises: performing a first measurement including measuring a field at a first sensor at a first position and measuring the field at a second sensor at a second position; interchanging the first sensor and the second sensor such that the first sensor is at the second position and the second sensor is at the first position; performing a second measurement including measuring the field at the first sensor at the second position and measuring the field at the second sensor at the first position; and using the first measurement and the second measurement to reduce errors in measuring the field, a difference in the field, or a combination of the field and the difference in the field. A method 2 can include the features of method 1 and can include generating, from the first measurement, a first difference between the measured field at the first position and the measured field at the second position; generating, from the second measurement, a second difference between the measured field at the first position and the measured field at the second position; and combining the first difference and the second difference. A method 3 can include the method 1 or 2 and can include generating the first difference includes generating the first difference with each of the first and second sensor positioned at a respective zero degree rotation position; generating the second difference includes generating the second difference with the first and second sensor positioned at a 180 degree rotation from their respective zero rotation positions; and combining the first difference and the second difference includes generating a difference between the first difference and the second difference. A method 4 can include the features of method 3 and can include: generating, from the first measurement, a first sum between the measured field at the first position at the zero degree rotation position and the measured field at the second position at the zero degree rotation position; generating, from the second measurement, a second sum between the measured field at the first sensor rotated 180 degrees from the zero rotation position of the first sensor and the measured field at the second sensor rotated 180 degrees from the zero rotation position of the second sensor; and generating a difference between the first sum and the second sum. A method 5 can include the features of method 4 and can include determining a range using the difference between the first difference and the second difference, a distance between the first sensor and the second sensor, and the difference between the first sum and the second sum. A method 6 can include the features of method 4 and can include determining the range to include determining a range between a target pipe in a target well and a pipe to which the first and second sensors are mounted in another well.

A method 7 can include features of any of methods 1-6 and can include interchanging the first sensor and the second sensor to include interchanging the first sensor having a first polarity at the first position and the second sensor having a second polarity at the second position such that the first sensor has the first polarity at the second position and the second sensor has the second polarity at the first position. A method 8 can include features of methods 7 and can include the first polarity being the same as the second polarity. A method 9 can include features of any of methods 1-6 and can include interchanging the first sensor and the second sensor to include interchanging the first sensor having a first polarity at the first position and the second sensor having a second polarity at the second position such that the first sensor at the second position has a polarity reversed from the first polarity and the second sensor at the first position has a polarity reversed from the second polarity. A method 10 can include features of methods 9 and can include the first polarity being reversed from the second polarity.

A method 11 can include features of any of methods 1-10 and can include interchanging the first sensor and the second sensor to include rotating a disk on which the first sensor and the second sensor are mounted. A method 12 can include features of any of methods 1-10 and can include interchanging the first sensor and the second sensor to include: rotating a disk on which the first sensor and the second sensor are mounted; and reversing wire contact to the first sensor and the second sensor with rotation of the disk to the position of the second measurement. A method 13 can include features of any of methods 1-12 and can include the field being a magnetic field. A method 14 can include features of any of methods 1-12 and can include the field being an electromagnetic field or an electric field. Features of any of methods 1-14 may be combined into a procedure according to the teachings herein.

In various embodiments, a machine-readable storage device 15 has instructions stored thereon, which, when performed by a machine, cause the machine to perform operations, the operations comprising operations to: perform a first measurement including measuring a field at a first sensor at a first position and measuring the field at a second sensor at a second position; interchange the first sensor and the second sensor such that the first sensor is at the second position and the second sensor is at the first position; perform a second measurement including measuring the field at the first sensor at the second position and measuring the field at the second sensor at the first position; and use the first measurement and the second measurement to reduce errors in measuring the field, a difference in the field, or a combination of the field and the difference in the field. A machine-readable storage device 16 can include instructions to perform operations, the operations including performing any of the operations of methods 1-14 or other operations similar to or identical to operations taught herein. Features of any of machine-readable storage devices 15 or 16 may be combined into a machine-readable storage device according to the teachings herein.

In various embodiments, a system 20 can comprise a sensor platform, a first sensor mounted to the sensor platform at a first position, the first sensor operable to measure a field; a second sensor mounted to the sensor platform at a second position, the second sensor operable to measure the field; and a processor operable with the sensor platform such that the processor provides control of the sensor platform such that the first sensor is operably interchanged with the second sensor, provides control of acquisition of measurement signals from the first sensor and the second sensor at both the first position and the second position; and provides use of the acquisition of the measurement signals to reduce errors in measurement of the field, a difference in the field, or a combination of the field and the difference in the field. A system 21 can include the features of system 20 and can include the sensor platform being a rotatable disk on which the first sensor is mounted on a diagonal through a center of the disk and the second sensor is mounted on the diagonal on an opposite side of the center from the first sensor. A system 22 can include the features of system 21 and can include the rotatable disk to include one or more sensor pairs, in addition to the first sensor and the second sensor, mounted thereon such each sensor of each sensor pair has an opposite orientation with respect to polarity compared to the other sensor of the respective pair. A system 23 can include the features of system 20 and can include the sensor platform to include one or more sensor pairs, in addition to the first sensor and the second sensor, mounted thereon such that all of the sensors have a common orientation with respect to polarity. A system 24 can include the features of system 20 and can include the sensor platform to include one or more sensor pairs, in addition to the first sensor and the second sensor, mounted thereon such that a first half of the sensors have a common orientation with respect to polarity and a second half of the sensors have an opposite polarity to the first half of the sensors. A system 25 can include the features of system 20 and can include the sensor platform being a beam that can rotate in two directions. A system 26 can include the features of any of systems 20-25 and can include a machine-readable storage device having instructions stored thereon, which, when executed by the processor, cause the system to perform operations, the operations including a determination of a range between a target pipe in a target well and a pipe to which the first and second sensors are mounted in another well based on the acquisition of the measurement signals from the first sensor and the second sensor interchanged by control of the sensor platform. A system 27 can include components to perform functions of any of the methods 1-14. A system 27 can include machine-readable storage device to perform functions of any of the machine-readable storage devices 15 or 16. Features of any of systems 20-28 may be combined into a system according to the teachings herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   measuring a field with a first sensor at a first position to determine a first measurement and measuring the field with a second sensor at a second position to determine a second measurement, the first and second sensors on a sensor platform in a first well;
   interchanging the first sensor and the second sensor to move the first sensor to the second position and move the second sensor to the first position;
   measuring the field with the first sensor at the second position to determine a third measurement and measuring the field with the second sensor at the first position to determine a fourth measurement; and
   based on the measurements from the first sensor and the second sensor, generating compensated measurements by reducing sensor errors in measuring the field using a compensation scheme, wherein the sensor errors comprise at least one of a first sensor error corresponding with the first sensor and a second sensor error corresponding with the second sensor, and wherein the compensation scheme comprises generating a first difference from the first and second measurements, generating a second difference from the third and fourth measurements, and combining the first difference and the second difference; and
   determining a range between a target pipe in a target well and the sensor platform based on the compensated measurements.

2. The method of claim 1, wherein the second position is at a 180 degree rotation from the first position; and combining the first difference and the second difference comprises generating a third difference between the first difference and the second difference.

3. The method of claim 2, wherein the method comprises:
   generating, from the first and the second measurements, a first sum;
   generating, from the third and fourth measurements, a second sum; and
   generating a fourth difference between the first sum and the second sum.

4. The method of claim 3, wherein determining the range comprises determining the range based on the third difference, a distance between the first sensor and the second sensor, and the fourth difference.

5. The method of claim 4, a pipe is attached to the sensor platform in the first well.

6. The method of claim 1, wherein the first sensor has a first polarity at the first position and has the first polarity at the second position, and wherein the second sensor has a second polarity at the first position and has the second polarity at the second position.

7. The method of claim 6, wherein the first polarity is the same as the second polarity.

8. The method of claim 1, wherein the first sensor has a first polarity at the first position and has a first reversed polarity at the second position, and wherein the first reversed polarity is the reverse of the first polarity, and wherein the second sensor has a second polarity at the second position and has a second reversed polarity at the first position, and wherein the second reversed polarity is the reverse of the second polarity.

9. The method of claim 8, wherein the first polarity is reversed from the second polarity.

10. The method of claim 1, wherein interchanging the first sensor and the second sensor comprises rotating a disk on which the first sensor and the second sensor are mounted.

11. The method of claim 1, wherein interchanging the first sensor and the second sensor comprises:
rotating a disk on which the first sensor and the second sensor are mounted; and
reversing wire contact to the first sensor and the second sensor with rotation of the disk to rotate the first sensor to the second position and rotate the second sensor to the first position.

12. The method of claim 1, wherein the field is a magnetic field.

13. The method of claim 1, wherein the field is an electromagnetic field or an electric field.

14. A machine-readable storage device having instructions stored thereon, which, when performed by a machine, cause the machine to perform operations, the operations comprising operations to:
measure a field with a first sensor at a first position to determine a first measurement and measure the field with a second sensor at a second position to determine a second measurement, the first and second sensors on a sensor platform in a first well;
interchange the first sensor and the second sensor to move the first sensor to the second position and move the second sensor to the first position;
measure the field with the first sensor at the second position to determine a third measurement and measure the field with the second sensor at the first position to determine a fourth measurement; and
based on the measurements from the first sensor and the second sensor, generate compensated measurements by reducing sensor errors in measuring the field using a compensation scheme, wherein the sensor errors comprise at least one of a first sensor error corresponding with the first sensor and a second sensor error corresponding with the second sensor, and wherein the compensation scheme comprises generating a first difference from the first and second measurements, generating a second difference from the third and fourth measurements, and combining the first difference and the second difference; and
determine a range between a target pipe in a target well and the sensor platform in the first well based on the compensated measurements.

15. The machine-readable storage device of claim 14, wherein the second position is at a 180 degree rotation from the first position, and wherein operations to combine the first difference and the second difference comprise generating a third difference between the first difference and the second difference.

16. The machine-readable storage device of claim 15, wherein the operations comprise operations to:
generate, from the first and second measurements, a first sum;
generate, from the third and fourth measurements, a second sum; and
generate a fourth difference between the first sum and the second sum.

17. The machine-readable storage device of claim 16, wherein the operations to determine the range comprise operations to determine the range based on the third difference, a distance between the first sensor and the second sensor, and the fourth difference.

18. The machine-readable storage device of claim 14, wherein the instructions to operably interchange the first sensor and the second sensor comprises instructions to rotate a disk on which the first sensor and the second sensor are mounted.

19. A system comprising:
a sensor platform in a first well;
a first sensor mounted to the sensor platform at a first position, the first sensor operable to measure a field;
a second sensor mounted to the sensor platform at a second position, the second sensor operable to measure the field; and
a processor operable with the sensor platform to provide control of the sensor platform to,
measure the field with the first sensor at the first position to determine a first measurement and measuring the field with the second sensor at the second position to determine a second measurement,
operably interchange the first sensor with the second sensor to move the first sensor to the second position and move the second sensor to the first position,
measure the field with the first sensor at the second position to determine a third measurement and measuring the field with the second sensor at the first position to determine a fourth measurement, and
based on the measurements from the first sensor and the second sensor, generate compensated measurements by reducing sensor errors in measuring the field using a compensation scheme, wherein the sensor errors comprise at least one of a first sensor error corresponding with the first sensor and a second sensor error corresponding with the second sensor, and wherein the compensation scheme comprises generating a first difference from the first and second measurements, generating a second difference from the third and fourth measurements, and combining the first difference and the second difference; and
determine a range between a target pipe in a target well and the sensor platform in the first well based on the compensated measurements.

20. The system of claim 19, wherein the sensor platform is a rotatable disk on which the first sensor is mounted on a diagonal through a center of the rotatable disk and the second sensor is mounted on the diagonal on an opposite side of the center from the first sensor.

21. The system of claim 20, wherein the rotatable disk comprises one or more sensor pairs, in addition to the first sensor and the second sensor, mounted thereon, and wherein each sensor pair has a first paired sensor and a second paired sensor, wherein the first paired sensor has an opposite orientation with respect to polarity compared to the second paired sensor.

22. The system of claim 19, wherein the sensor platform comprises a plurality of sensors divisible as sensor pairs, in addition to the first sensor and the second sensor, mounted thereon, and wherein the plurality of sensors have a same orientation with respect to polarity.

23. The system of claim 19, wherein the sensor platform comprises a plurality of sensors divisible as sensor pairs, in addition to the first sensor and the second sensor, mounted thereon, and wherein a first half of the plurality of sensors have a same orientation with respect to polarity and a second half of the plurality of sensors have an opposite polarity to the first half of the sensors.

24. The system of claim 19, wherein the sensor platform is a beam rotatable in two directions.

25. The system of claim 19, wherein in the first well is attached to the sensor platform.

26. The system of claim 19, wherein combining the first difference and the second difference comprises generating a third difference between the first difference and the second difference.

* * * * *